Patented Dec. 17, 1946

2,412,814

UNITED STATES PATENT OFFICE 2,412,814

BETA-ALKYL-THIO ACROLEIN MERCAPTALS

John David Kendall and Harry Derek Edwards, Ilford, England, assignors to Ilford Limited, Ilford, England, a British Company No Drawing. Application December 17, 1943, Serial No. 514,666. In Great Britain January 1, 1943

2 Claims. (Cl. 260—609)

This invention relates to the production of organic compounds which are useful as intermediates for the formation of dyestuffs, and to the organic compounds so produced.

According to the present invention organic compounds of the general Formula I:

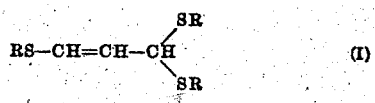

where R is an alkyl group, are obtained by treating with an alkyl mercaptan, in the presence of an acid condensing agent, a compound of one of the Formulae II, III, IV or V:

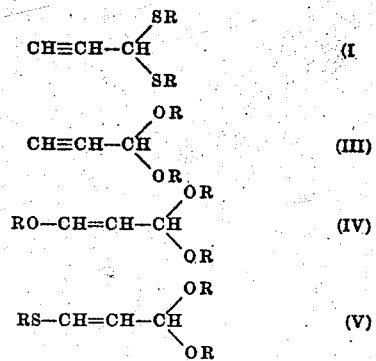

or by treating with an alkyl mercaptan in the presence of a basic condensing agent under pressure, a compound of Formula II.

Compounds of the general Formula II may be obtained by brominating acrolein and treating the product with an alkyl mercaptan followed by heating with an alkali to remove bromine. Compounds of general Formula III may be converted to compounds of general Formula V by treating them with a sodium alkyl mercaptide and an alkyl mercaptan under pressure.

Beta-alkyl-thio acrolein di-alkyl mercaptals can be made by treating a compound of Formula II in which the groups R are alkyl groups with alkyl mercaptan in the presence of a basic condensing agent under pressure.

The most convenient compound of general Formula I to prepare is that in which the groups R are ethyl groups since ethyl mercaptan is the most convenient of the alkyl mercaptans to employ. In using the compounds of general Formula I as dyestuff intermediates the condensation to produce dyestuffs may eliminate all the —SR groups so that the nature of the R group is not then of importance.

The acid condensing agent may be any strongly acidic substance; sulphuric acid and zinc chloride have been found very suitable.

The following examples illustrate the invention, as applied to the production of the compound $\beta$-ethyl thio acrolein diethyl mercaptal.

EXAMPLE I (a) *Preparation of propargyl aldehyde diethyl mercaptal from acrolein*

100 grams of acrolein was cooled to about 5° C. and 90 ccs. of bromine added dropwise, with good shaking, over about 2 hours. 5 gms. of sodium bicarbonate was added and the mixture left overnight. The acrolein dibromide was filtered and then added slowly to 260 gms. of ethyl mercaptan, with stirring and cooling so that the temperature was kept below 10° C. The reaction mixture was then allowed to stand for two hours at room temperature. 5 gms. of sodium bicarbonate was then added and the mixture allowed to stand overnight. A solution of 200 gms. of caustic potash in 900 ccs. ethyl alcohol was prepared and the reaction mixture (now containing acrolein dibromide mercaptal) added slowly at a temperature of about 30–40° C. The mixture was then boiled under reflux for ½ hour. The alcohol was then distilled off through a partial condenser, and after standing for 14 hours the residue was filtered from the precipitated potassium bromide and concentrated further. The potassium bromide precipitate was dissolved in 1 litre of water and added to the concentrate from the alcohol distillation. Oil was precipitated and was separated off. The aqueous liquors were then extracted, and the ether extracts and oil bulked and dried over sodium carbonate. The ether was distilled off and the residue distilled in vacuo. The product contained a trace of bromine which was removed by boiling under reflux with 5 gms. sodium mercaptide in 100 ccs. alcohol for ½ hour. The alcohol was distilled off, the residue poured into water, ether-extracted and distilled as before, giving the product as an oil. B. P. 125° C. at 10 mm. pressure.

(b) *Preparation of $\beta$-ethyl-thio acrolein diethyl mercaptal from propargyl aldehyde diethyl mercaptal*

80 gms. of propargyl aldehyde diethyl mercaptal, 75 ccs. of ethyl mercaptan and 68 gms. of anhydrous zinc chloride were mixed in the cold and allowed to stand for two days, after which the mixture was poured on to cracked ice, and treated with a little dilute acid. The oil obtained was separated from the aqueous liquors, which were extracted with ether. The oil and ether extracts were bulked and well washed with water, followed by sodium carbonate solution, and finally dried over potassium carbonate. The solution was filtered and the ether distilled off. The residual oil was distilled in vacuo, collecting fractions (1) up to 120° C., (2) 120–160° C., (3) 160–195° C. Distillates (2) and (3) were redistilled fractionally from a sulphuric acid bath to give the product boiling at 185–192° C. at 6 mm. pressure.

(c) *Alternative preparation of β-ethyl-thio acrolein diethyl mercaptal from propargyl aldehyde diethyl mercaptal*

53 gms. of propargyl aldehyde diethyl mercaptal, 50 ccs. of ethyl mercaptan and 5 drops of concentrated sulphuric acid were mixed in the cold and allowed to stand for a week. The acid layer was then separated off and the oil well washed with water and dried over potassium carbonate. After filtering, the excess ethyl mercaptan was distilled off from a water bath and the residue distilled in vacuo, separating into three fractions which were redistilled to give the product boiling at 168–190° C. at 6 mm. pressure.

EXAMPLE II (a) *Preparation of β-ethyl-thio acrolein diethyl acetal from propargyl aldehyde diethyl acetal*

12.8 gms. of propargyl aldehyde diethyl acetal, 16.8 gms. of sodium mercaptide and 15 ccs. of ethyl mercaptan were heated together in a sealed tube, the temperature being raised to 120° C. over 3½ hours and maintained at 115° C.–120° C. for four hours. When cool the reaction mixture was poured on to crushed ice and the oil separated by extraction with ether. The ether extracts were dried over potassium carbonate, the solution filtered and the ether distilled off. The residual oil was distilled twice under reduced pressure to yield the product boiling at 105° C. at 6 mm. pressure.

(b) *Preparation of β-ethyl-thio acrolein diethyl mercaptal from β-ethyl-thio acrolein diethyl acetal*

33 gms. of β-ethyl-thio acrolein diethyl acetal, 40 gms. of ethyl mercaptan and 13 gms. of anhydrous zinc chloride were employed. The zinc chloride was added carefully to the cooled solution of the β-ethyl-thio acrolein diethyl acetal in the ethyl mercaptan. The reaction mixture was allowed to stand for 6 days and then poured into ice water containing a small amount of dilute hydrochloric acid. The oil which precipitated was separated off and the aqueous liquors extracted with ether. The oil and the ether extracts were bulked and washed with water and 10% sodium carbonate solution, and finally dried over potassium carbonate. The ether solution was filtered and the solvent distilled off. The product was obtained by distillation of the residual oil in vacuo, as a yellow oil, B. P. 190° C. at 10 mm. pressure.

EXAMPLE III

*Preparation of β-ethyl-thio acrolein diethyl mercaptal from propargyl aldehyde diethyl acetal*

25 gms. of propargyl aldehyde diethyl acetal, 60 ccs. of ethyl mercaptan and 3.5 ccs. of 50% aqueous sulphuric acid (by volume) were mixed and allowed to stand for 12 days. At the end of this period ether was added and the solution washed with water and sodium carbonate solution and dried over potassium carbonate. The ether extracts were filtered and the solvent distilled off. Distillation of the residue under reduced pressure gave the required product and, as a low boiling fraction, some β-ethyl-thio acrolein diethyl acetal.

EXAMPLE IV

*Preparation of β-ethyl-thio acrolein diethyl mercaptal from β-ethoxy acrolein diethyl acetal*

7.2 gms. of β-ethoxy acrolein acetal were mixed with 12 ccs. of ethyl mercaptan and 1 cc. of a 50% aqueous sulphuric acid solution was added. The reaction mixture, which grew hot, was cooled and then allowed to stand at room temperature for 10 days. Ether was then added, the acid layer separated off, and the ether extract, after washing with 10% sodium carbonate solution, was dried over anhydrous potassium carbonate. The ether was distilled off and the residual oil distilled in vacuo, and the following fractions collected: (1) —80° C., (2) 80–120° C., (3) 120–160° C., (4) 160–200° C. Fraction (4) was redistilled to yield the required product.

What we claim is:
1. Compounds of the general formula:

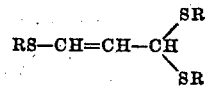

where the groups R are alkyl groups.

2. The compound of the general formula:

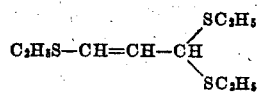

JOHN DAVID KENDALL.
HARRY DEREK EDWARDS.